Figure 1:
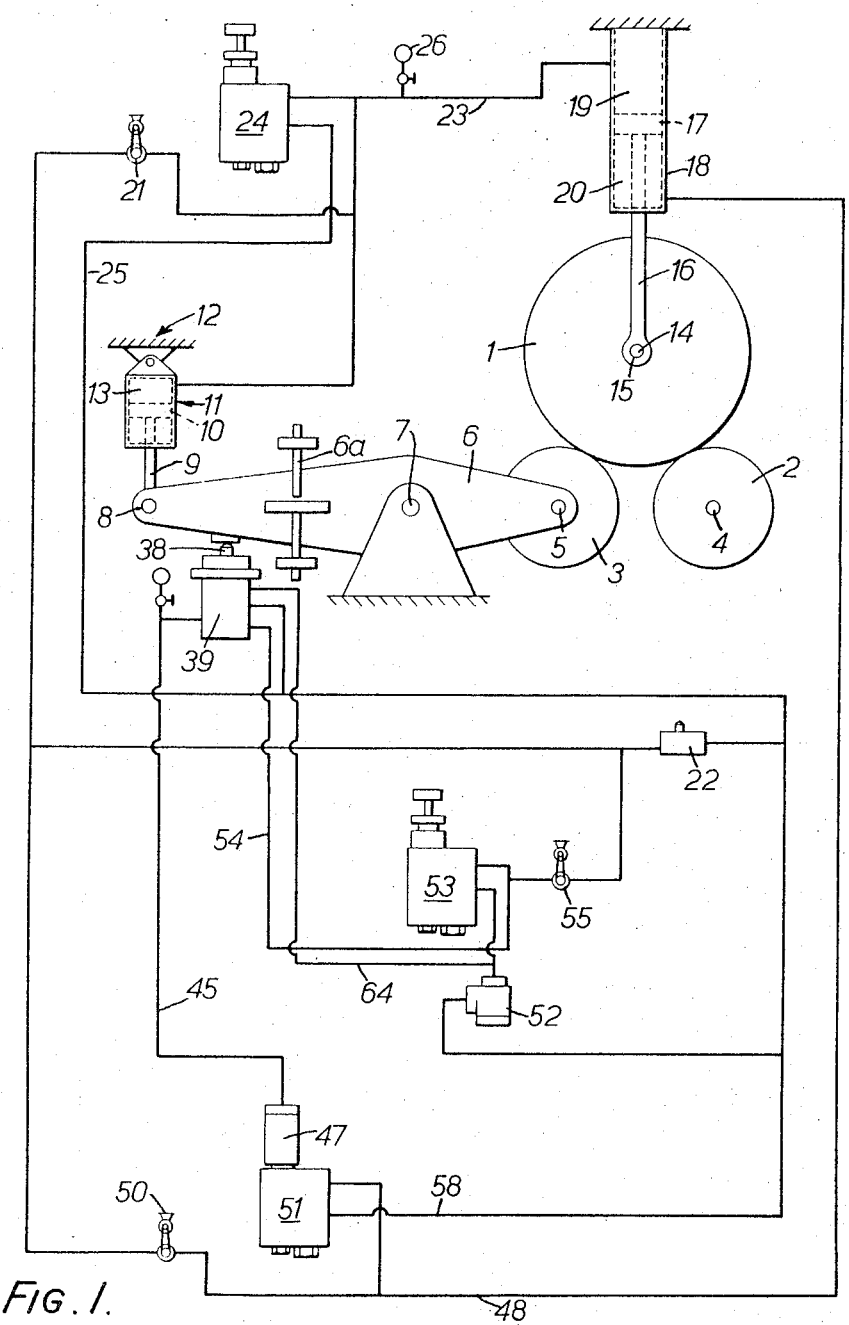

INVENTORS
ERIC W. REID and
JOHN D. KIDD

BY
WATSON, COLE, GRINDLE + WATSON
ATTORNEYS 3,306,547
WINDING APPARATUS
Eric William Reid, Reading, England, and John Duff Kidd, Edinburgh, Scotland, assignors to Keelavite Hydraulics Limited, Coventry, England, and Bertrams Limited, Edinburgh, Scotland, both companies of Great Britain
Filed Apr. 2, 1965, Ser. No. 445,219
3 Claims. (Cl. 242—66)

This invention relates to winding apparatus of the kind in which a roll of material wound upon a core or reel (hereinafter called a reel) is supported upon a pair of rotatable supporting drums, one at least of which is arranged to be driven and which are usually geared to one another so as to rotate synchronously in the same direction and, in any case cause rotation of the reel for winding-on purposes and apply tension to the material during the winding process.

Winding apparatus of the above kind according to the present invention includes means (hereinafter for convenience called auxiliary reel-supporting means) comprising one or more subsidiary members (herein for convenience called subsidiary supporting members) to which the reel is rotatably connected by bearings, power-operated apparatus arranged to apply to such auxiliary supporting member or members a force tending to move the reel away from or towards the supporting drums, and control means arranged to be responsive to changes in the weight of the reel and automatically to cause variations in the force applied by the power-operated apparatus to the auxiliary supporting member or members in a sense such as to counteract partially or wholly variations in the force with which the reel bears on the supporting drums due to the progressive increase in the weight of the reel during the winding process.

The arrangement will normally be such as to ensure as far as possible that the force with which the reel bears on the supporting drums will remain constant throughout the winding process.

In a convenient arrangement according to the invention one of the supporting drums is arranged to be movable against an opposing force under the influence of changes in the weight of the reel, and the control means is arranged to be responsive to such movement. Moreover means may be provided for manually varying such opposing force simultaneously with and in the same sense as variations in the force applied by the auxiliary supporting member or members to the reel for the purpose of adjusting the pressure between the reel and the supporting drums while preventing or restricting changes in the relative positions of the two supporting drums.

In any case means are preferably provided by which the relationship between the weight of the reel and the force applied by the power-operated apparatus to the auxiliary supporting member or members can be adjusted at will for the purpose of allowing for variations in the mean weight of the reel to be supported and/or allowing for adjustment of the relationship between the mean weight of the reel and the force applied to it by the auxiliary supporting members or members.

Preferably the power-operated apparatus comprises one or more hydraulic piston and cylinder assemblies, for example a pair of cylinders containing pistons having piston rods in the outer ends of which the ends of a spindle on which the reel is mounted are supported in bearings, while the control means comprises valve apparatus arranged to be responsive to variations in the weight of the reel and to control automatically the pressure maintained in the appropriate pressure chamber or chambers (herein called variable pressure chambers) of said piston and cylinder assembly or assemblies.

The power operated apparatus may also include one or more further pressure chambers (herein called adjustable pressure chambers) the pressure in which acts in a direction pressing the reel towards the supporting drums and in such an arrangement wherein, as referred to above, one of the supporting drums is arranged to be movable against an opposing force applied thereto, such opposing force is conveniently applied by a hydraulic device and means are provided by which the pressure in the pressure chamber of such hydraulic device can be adjusted manually similarly and simultaneously with adjustment of the pressure in the adjustable pressure chamber or chambers referred to. For example the pressure chamber of the hydraulic device referred to and the adjustable pressure chamber or chambers may be interconnected so as to be subject to the same adjustable pressure.

Figure 2:
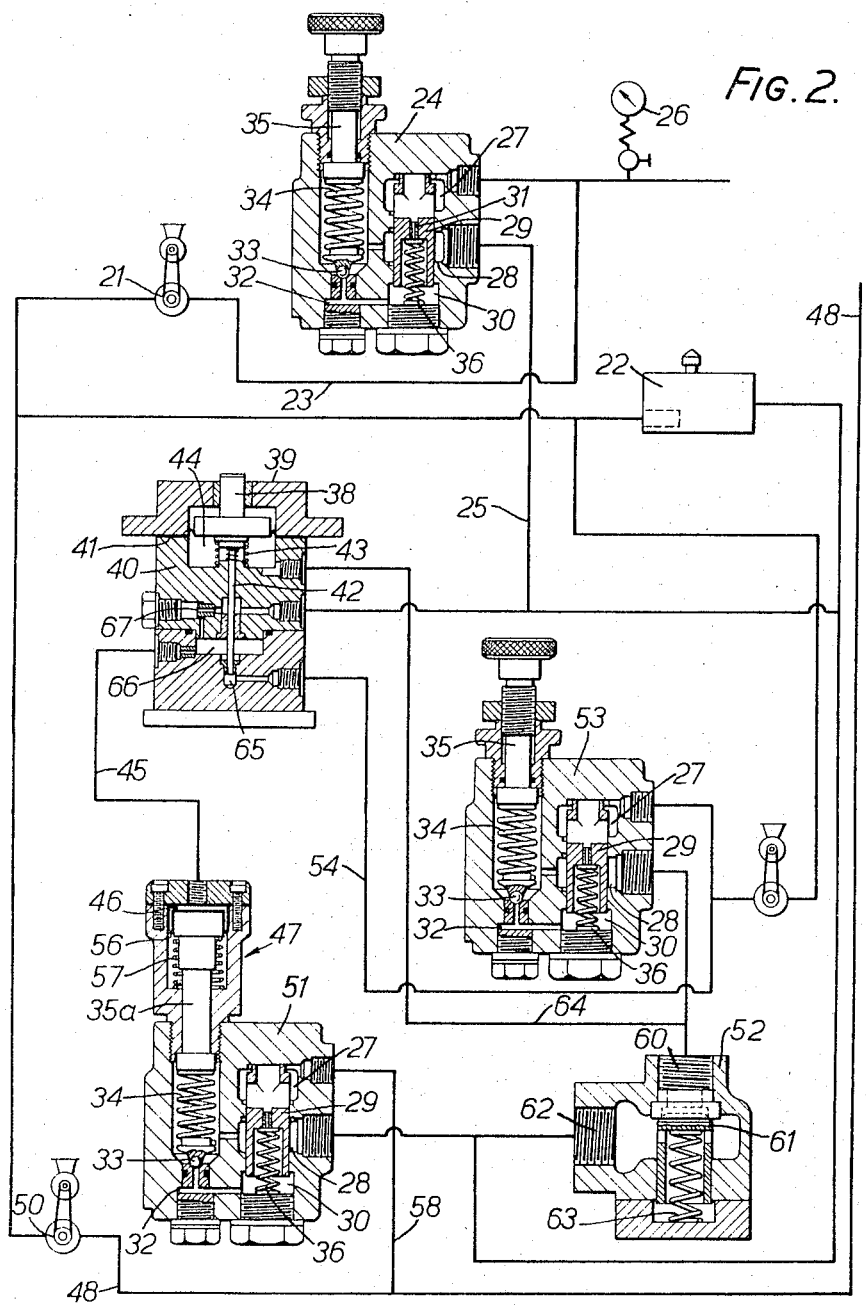

One construction according to the present invention is shown by way of example diagrammatically in the accompanying drawings in which:

FIGURE 1 is a diagrammatic side elevation of winding apparatus and the control apparatus therefor according to the invention, and, FIGURE 2 is a detailed view of the control apparatus showing the various valves in cross section.

As shown in FIGURE 1 the apparatus comprises a reel 1 supported on a pair of drums 2 and 3, the drum 2 being mounted for rotation about a fixed axis 4 while the drum 3 is supported in bearings 5 in one end of a duplex lever 6 pivoted at 7 and connected at its other end 8 by a connecting rod 9 to the piston 10 of a hydraulic device indicated generally at 11 the cylinder of which is connected to a fixed part 12, the hydraulic device having a working pressure chamber 13.

The reel 1 has a spindle 14 the ends of which are mounted in bearings 15 in the lower ends of a pair of piston rods 16 connected to pistons 17 in hydraulic cylinders 18 the upper ends 19 and lower ends 20 of which constitute working pressure chambers. The chambers 19 and 13 are connected to a common source of pressure which is adjustable but remains constant during operation and the cross sectional areas of the chambers 19 and 13 and the leverage ratio of the duplex lever 6, are such that with an empty reel shell supported on drums 2 and 3 and equal pressures in the chambers 13 and 19 forces applied to the duplex lever exactly counter-balance one another. Adjustment of the pressure in the chambers 13 and 19 thus controls the "nip" pressure between the reel 1 and the drum 3 while not affecting the balance of the lever 6 and this pressure can thus be set to the required value before commencement of the winding operation without affecting the operation of the rest of the apparatus.

The means for maintaining and adjusting this pressure comprise a motor driven pump 21 arranged to draw liquid from a reservoir 22 and deliver it to a common passage 23 communicating with the chambers 13 and 19 and also with the inlet port of an adjustable relief valve 24 the outlet port of which communicates through a relief passage 25 with the reservoir 22. The pressure in the passage 23 is indicated by a pressure gauge 26.

The relief valve 24 is of known type and as shown in FIGURE 2 comprises a body having formed therein inlet and outlet chambers 27 and 28 respectively, between which chambers lies a port controlled by a piston type valve 29 the upper end of which is directly subject to the pressure in the inlet chamber 27 while its lower end is subject to the pressure in a pressure chamber 30 which communicates with the inlet chamber 27 through a restricted passage 31, the chamber 30 also communicating with the outlet chamber 28 through a passage 32 controlled by a spring pressed pilot valve 33 the pressure of the spring 34 acting on which is manually adjustable by means of an adjustable abutment 35.

The valve 29 is urged towards its closed position by a light spring 36 and opens automatically when the pressure in the inlet chamber, and therefore in the pressure chamber 30 is sufficient to open the pilot valve 33 and thereby cause the pressure in the chamber 27 slightly to exceed that which can be maintained in the chamber 30 through the restricted orifice 31. The valve 24 thus maintains in the passage 23 a pressure dependent on the setting of the adjustable abutment 35, which thus controls the nip pressure.

The means for varying the pressure in the pressure chambers 20 are arranged to be automatically responsive to small changes in the angular position of the lever 6 (which is constrained to move between the fine limits of adjustable stop 6a) caused by changes in the weight of the reel 1. To this end the lever 6 acts on the movable member 38 of a sensitive control device 39 by which the pressure in a hydraulic system including the pressure chambers 20 is controlled, and which system will be more fully described with reference to FIGURE 2.

The control device 39 comprises a housing 40 within which is a flexible diaphragm 41 on the upper surface of which the movable member 38 bears while its lower surface is acted upon by the upper end of a valve member 42 under the influence of a compression spring 43. The lower face of the diaphragm 41 is also subject to the pressure in a chamber 44 within the housing 40 and the movable member 38 is thus always maintained in contact with the lever 6 the position of which will therefore control the position of the valve member 42.

Means are provided by which a predetermined pressure can be maintained in the chamber 44 while the valve 42 acts, in a manner hereinafter described, to control the pressure in a passage 45 which communicates with the pressure chamber 46 of a pressure responsive device 47 to determine in a manner hereinafter described the pressure maintained in a passage 48 communicating with the chamber 20 of the cylinder 18 to determine the force applied to the piston 17. Fluid is supplied to the passage 48 by means of a main motor driven pump 50 drawing fluid from the reservoir 22.

The pressure in the passage 48 is under the control of a valve indicated generally at 51, the pressure maintained at any moment in tthe chamber 44 is controlled by a valve indicated generally at 52, while a valve 53 acting as a relief valve is arranged to maintain a determined constant pressure in a control fluid supply passage 54 to which hydraulic fluid is delivered constantly by an auxiliary motor driven pump 55, the purpose of the valve 53 being to maintain a constant fluid pressure in the control fluid supply passage 54 higher than that required in the chamber 44.

The valve 53 is the same as the valve 24 and the same reference numerals have accordingly been used. The function of the valve is thus the same and will not again be described.

The valve 51 is similar to the valve 24 except that the manually adjustable abutment member 35 is replaced by the pressure responsive device 47 referred to above, the chamber 46 of which is in communication with the sensitive control device 39. The device 47 includes an abutment member 35a, the position of which determines the effective force of the spring 34 and hence the opening pressure of the pilot valve 33 of the valve 51. The abutment member 35a is controlled by the pressure in the chamber 46 acting on a diaphragm 56 and against the action of a spring 57. The inlet chamber 27 of the valve 51 is connected to the main delivery passage 48 and the outlet chamber 28 is connected to a relief passage 58. The valve 52 is a known type of pressure relief valve and comprises an inlet 60 controlled by a spring loaded valve 61 of tapered form, and an outlet 62. The spring 63 controlling the valve 61 is such as to maintain in a pipe 64 connected between the inlet 60 and the chamber 44 a predetermined pressure lower than that maintained by the valve 53 in the passage 54. The inlet 60 of the valve 52 is connected to the outlet 28 of the valve 53 while the outlet 62 is connected to the relief passage 58. The valve thus functions in known manner to maintain in the chamber 44 the determined pressure.

The operation of the apparatus for controlling the pressure in the chamber 20 is as follows:

With the pumps 50 and 55 operating the valve 53 is set by means of its adjustable abutment 35 to maintain in the passage 54 a predetermined pressure and operates so to do in the same manner as the valve 24 which operation will not again be described. The abutment member 35 of the valve 53 is set so as to maintain in the passage 54 a pressure higher than that required in the chamber 46. The valve 52 acting as a pressure relief valve, serves to maintain a predetermined pressure in the chamber 44 as described above.

The valve 42 serves to control the pressure in the passage 48 and hence as follows. The valve 42 is a needle valve arranged to control an inlet passage 65 which is connected to the passage 54 and opens into a chamber 66 from which leads a restricted outlet passage 67 communicating with the relief passage 58. Upward movements of the valve 42 thus, by altering the relationship between the cross sectional areas respectively of the inlet passage 65 and the outlet passage 67 causes an increase in the pressure in the chamber 66 or the reverse according to whether the valve 42 is opening or closing. The valve 42 therefore serves to control the pressure in the chamber 46 and hence that maintained by the valve 51 in the passage 48, in accordance with the relationship between the downward pressure applied by the lever arm 6 and the upward pressure applied to this lever by the diaphragm 41 due to the pressure in the chamber 44.

Thus it will be seen that as the reel is wound the increase in weight is counteracted by the increase in the pressure in the chamber 20 and the value of the nip is maintained constant.

What we claim as our invention and desire to secure by Letters Patent is:

1. Winding apparatus including a reel to receive a roll of material, said reel being supported upon a pair of supporting drums rotatable about parallel axes at least one of which is arranged to be driven and to drive the reel, auxiliary reel supporting means comprising at least one subsidiary supporting member to which the reel is rotatably connected by bearings, power operated apparatus arranged to apply to such auxiliary supporting member a force tending to move the reel to vary the distance between the axis of the reel and the common plane in which the axes of the supporting drums lie, and control means arranged to be responsive to changes in the weight of the reel and automatically to cause variations in the force applied by the power operated apparatus to the auxiliary supporting member in a sense such as to counteract at least partially variations in the force with which the reel bears on the supporting drums due to the progressive increase in the weight of the reel during the winding process, one of the supporting drums being arranged to be movable against an opposing force under the influence of changes in the weight of the reel, and the control means being arranged to be responsive to such movement.

2. Winding apparatus as claimed in claim 1, in which means are provided for manually adjusting simultaneously both such opposing force and the force applied by the auxiliary supporting member to the reel for the purpose of adjusting the pressure between the reel and the supporting drums without affecting the operation of the control means.

3. Winding apparatus including a reel to receive a roll of material, said reel being supported upon a pair of supporting drums rotatable about parallel axes at least one of which is arranged to be driven and to drive the reel, auxiliary reel supporting means comprising at least one subsidiary supporting member to which the reel is rotatably connected by bearings, power operated apparatus arranged to apply to such auxiliary supporting member a force tending to move the reel to vary the distance between the axis of the reel and the common plane in which the axes of the supporting drums lie, and control means arranged to be responsive to changes in the weight of the reel and automatically to cause variations in the force applied by the power operated apparatus to the auxiliary supporting member in a sense such as to counteract at least partially variations in the force with which the reel bears on the supporting drums due to the progressive increase in the weight of the reel during the winding process, the power operated apparatus comprising at least one hydraulic piston and cylinder assembly including a first pressure chamber formed on one side of the piston by said piston and cylinder, while the control means comprises valve apparatus arranged to be responsive to variations in the weight of the reel and to control automatically the pressure maintained in the pressure chamber, the power operated apparatus including at least one further pressure chamber the pressure in which acts in a direction pressing the reel towards the supporting drums the arrangement being such that one of the supporting drums is arranged to be movable against an opposing force applied thereto, such opposing force being applied by a hydraulic device, and means being provided by which the pressure in the pressure chamber of such hydraulic device can be adjusted manually similarly and simultaneously with the adjustment of the pressure in the first pressure chamber.

References Cited by the Examiner
UNITED STATES PATENTS 2,609,157  9/1952  Asmussen et al. _____ 242—66

FRANK J. COHEN, *Primary Examiner.*

W. S. BURDEN, *Assistant Examiner.*